Dec. 14, 1965  W. ROTH  3,222,917
NON-DESTRUCTIVE TESTING OF OBJECTS
Filed March 7, 1962  3 Sheets-Sheet 1
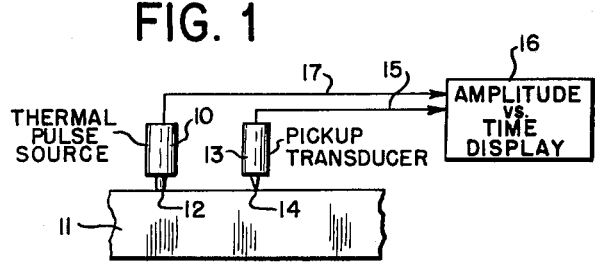
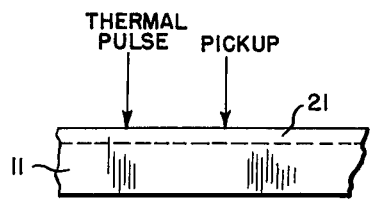
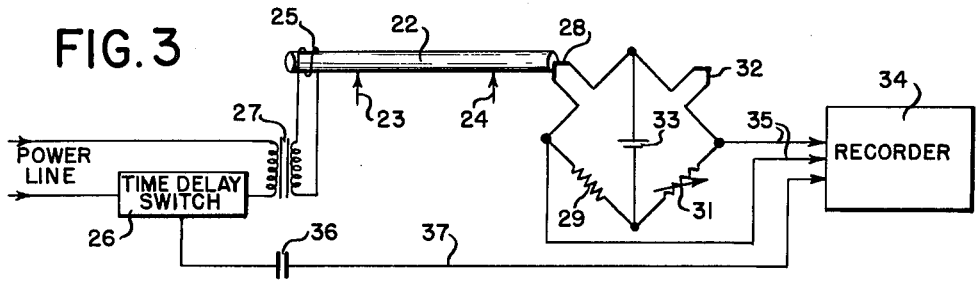
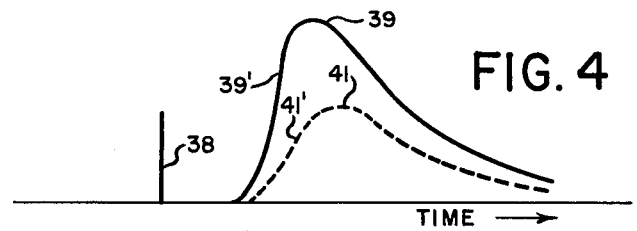
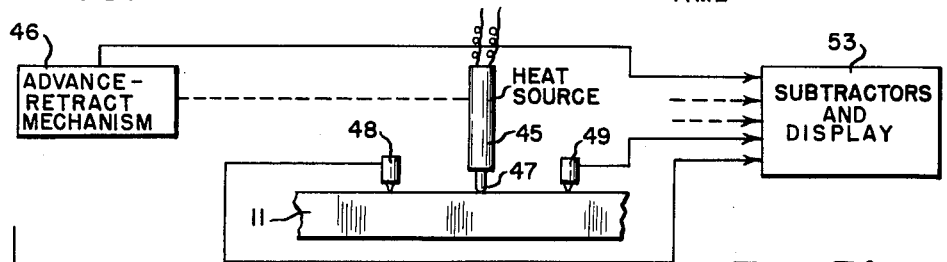
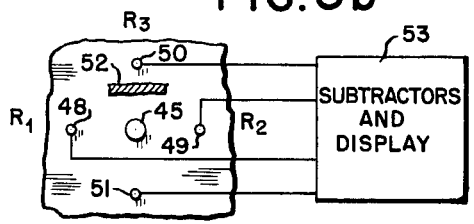
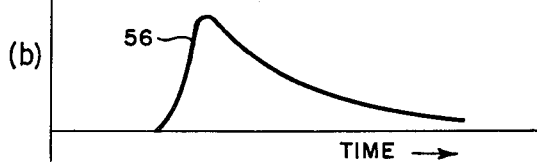
INVENTOR
Wilfred Roth
BY
ATTORNEYS

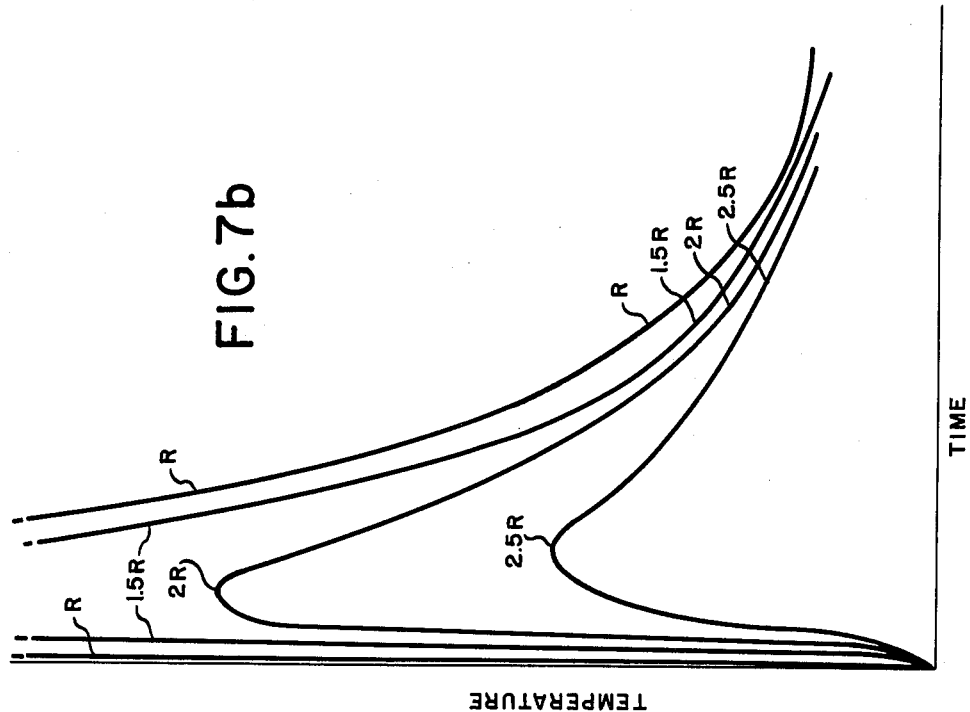
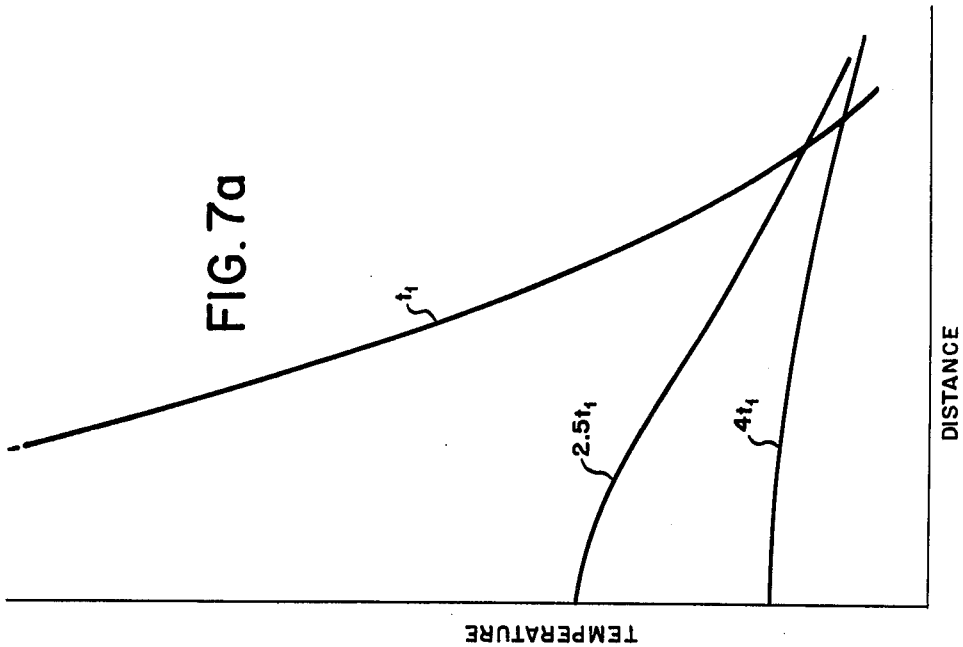

Dec. 14, 1965  W. ROTH  3,222,917
NON-DESTRUCTIVE TESTING OF OBJECTS
Filed March 7, 1962  3 Sheets-Sheet 3
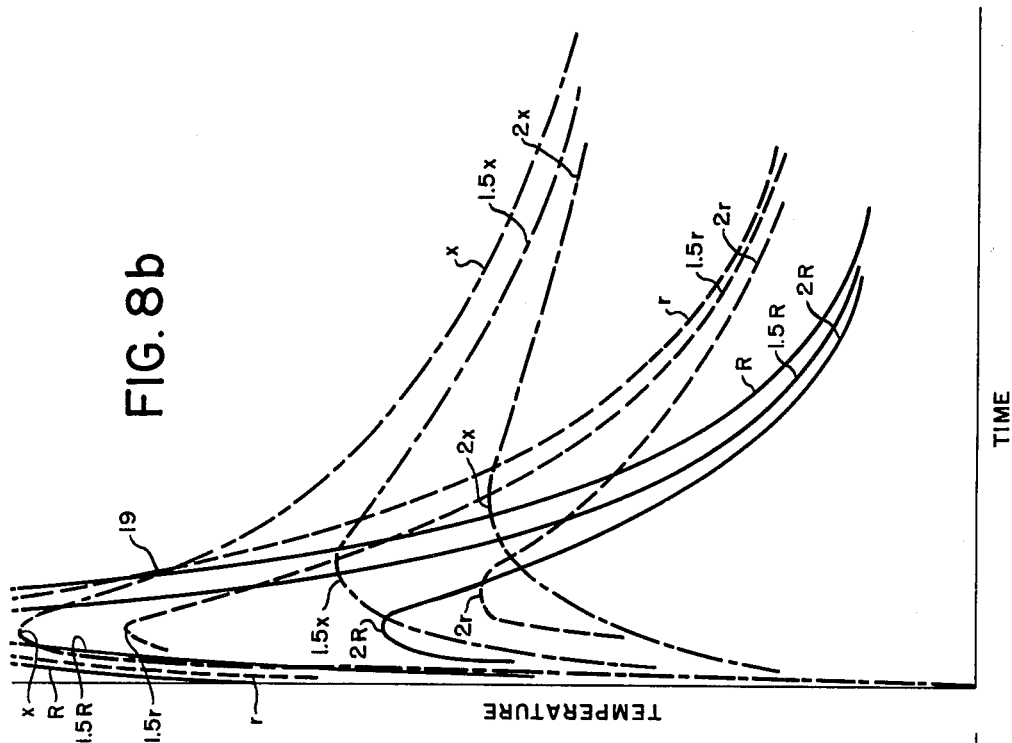
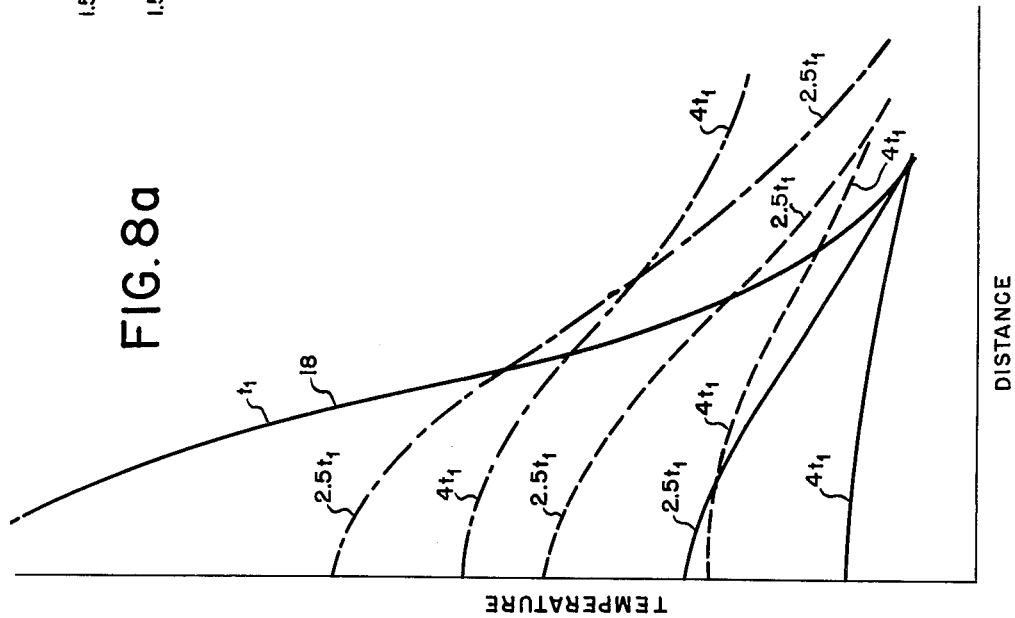
INVENTOR
Wilfred Roth
BY
ATTORNEYS

United States Patent Office 3,222,917
Patented Dec. 14, 1965

3,222,917
NON-DESTRUCTIVE TESTING OF OBJECTS
Wilfred Roth, West Hartford, Conn., assignor to Gabb Special Products, Inc., Windsor Locks, Conn., a corporation of Connecticut
Filed Mar. 7, 1962, Ser. No. 178,146
12 Claims. (Cl. 73—15)

This invention relates to the non-destructive testing of objects, and particularly to a method and apparatus utilizing thermal pulses for this purpose.

A number of procedures for the non-destructive testing of objects are now known, including those using X-rays, ultrasonic waves, etc. Thermal procedures are also known, and in general utilize steady state phenomena.

Although known procedures yield valuable information, there is continuing need for improved procedures capable of detecting various types of flaws more conveniently or accurately, or capable of detecting types of flaws for which known procedures are ineffective.

The present invention is directed to a thermal pulse method and apparatus for testing objects which is capable of determining the presence of a large variety of types of flaws.

In accordance with the invention, a thermal pulse is applied to a localized region of the object under test, and the transient response at a localized region spaced from the region of thermal pulse application is utilized to indicate the presence or absence of flaws.

As will be developed hereinafter, when a short pulse of heat is injected into an object, the temperature of nearby regions rises relatively rapidly to a peak value and then falls more slowly thereafter. In general, the shape and amplitude of the temperature variation varies with flaws between injection and pickup points, and also the time occurrence thereof with respect to the time of application of the heat pulse. These variations may be utilized to determine the presence or absence of flaws.

It is particularly contemplated to display the temperature at the pickup point as a function of time relative to the time of applying the corresponding heat pulse. Thus, variations in shape, peak amplitude and time occurrence may readily be ascertained. However, in some applications, it may suffice to determine only one type of variation, in which case other indicating means may be employed.

For most applications the thermal pulse is conveniently a heat pulse which raises the temperature of the object. However, where desired the thermal pulse may be a pulse of "cold" forming a heat sink which lowers the temperature. The latter may be particularly useful where the object cannot withstand heating.

The invention will be better understood from the following detailed description of the principles thereof, and specific embodiments thereof.

In the drawings:

FIG. 1 is a diagrammatic representation of apparatus suitable for use in accordance with the invention;

FIG. 2 illustrates the use of the invention in testing surface coatings;

FIG. 3 is a specific embodiment of one type of apparatus;

FIG. 4 shows curves illustrating the operation of the embodiment of FIG. 3;

FIGS. 5a and 5b show another specific embodiment of the invention;

FIGS. 6a and 6b are curves illustrating the operation of the apparatus of FIGS. 5a and 5b; and FIGS. 7a, 7b, 8a and 8b are curves illustrating certain principles relating to the invention.

Referring to FIG. 1, a thermal pulse source 10 is shown in contact with an object 11 so as to apply a thermal pulse to a localized region 12 thereof. A pickup transducer 13 contacts a localized region 14 of the object which is spaced from region 12. The output of transducer 13 is supplied through line 15 to an amplitude versus time display 16. Pulse source 10 is also connected through line 17 to unit 16 so as to indicate the time of application of the thermal pulse.

The thermal pulse source may take a wide variety of forms. For example, a preheated or precooled body may be mechanically moved to contact the object under test for a short time interval. Or, an element in contact with the object may be induction heated by an electric current pulse, etc. Or, thermocouple or PNP–NPN junction type devices for developing positive or negative temperature pulses (hot or cold) may be employed. These and other means for applying heat or cold to an object are known in the art.

The pickup transducer 13 may be any suitable heat detector such as a thermistor, pyroelectric element, thermocouple, etc. The response time of the detector should be sufficiently short to faithfully follow the temperature variation of the heat pulse at the pickup point. The amplitude versus time display may be a chart recorder, a cathode-ray oscilloscope having a sufficiently slow sweep for the particular application, etc.

In the following, it will be assumed that a heat pulse is being applied, for convenience of explanation. Adaptation of the explanation for cold pulses will be clear to those skilled in the art.

In general, when a heat pulse is injected into region 12, the heat energy diffuses from the point of injection. If all dimensions of object 11 are large, the heat energy will diffuse in a spherically symmetrical three-dimensional manner for a homogeneous object. If the object is a sheet whose thickness is small compared to its lateral dimensions, essentially two-dimensional or cylindrical flow will take place. If the object is essentially one-dimensional, for example a thin rod, essentially one-dimensional or linear flow will occur. For a given application of heat, different responses of pickup 13 will result under these different flow conditions.

In any of these cases, if the temperature at the injection point were maintained elevated for an indefinite time, the temperatures in nearby regions would gradually rise to equilibrium values. However, if a short heat pulse is applied, the temperature at nearby points will rise fairly rapidly to a peak value and then fall more slowly. In general, the closer the pickup point is to the injection point, the sharper the peaks will be.

FIGS. 7a, 7b and 8a, 8b are curves illustrating the types of flow which will obtain under certain specified conditions. The conditions selected are those which facilitate calculation, and do not necessarily represent actual conditions in a particular application. However, they serve to illustrate the principles of the invention.

FIG. 7a shows curves of temperature versus distance at successively increasing times for a given quantity of heat injected at a point in the interior of a three-dimensional object of indefinite extent. These curves are plotted from the equation:

$$T = \frac{Q}{(4\pi K t)^{3/2}} e^{-R^2/4Kt} \qquad (1)$$

where

T = temperature
Q = strength of source in heat energy units
K = thermal diffusivity
R = radial distance from the source
t = time The curves are labeled $t_1$, $2.5t_1$ and $4t_1$, where $t_1$ is a given time from the instant of heat injection. With the scale chosen, the temperature at time $t_1$ is off-scale near the source. As will be observed, at any given time the temperature is higher near the point of injection than at a distance therefrom.

With a given quantity of heat energy injected at the surface of a large object, approximately hemispherical heat flow will result and the curves will be of similar shape but will differ by a scale factor.

FIG. 7b is a replot of the information in FIG. 7a, with temperature plotted as a function of time for various distances from the injection point. The curves are labeled R, 1.5R, 2R and 2.5R, corresponding to respective radial distances. As will be observed, at any given distance the temperature rises fairly rapidly to a peak, and then decreases more slowly. For larger distances, the peak value is less, and also the slope of the leading edge is less. The slope can also be specified in terms of rise time, that is, the time between a specified small percent and a specified large percent of the peak value, and it will be noted that the rise time is greater for larger distances. Also, it will be noted that the time occurrence of the peak values is greater for larger distances.

Similar sets of curves can be calculated and plotted for two-dimensional and one-dimensional flow. The flow equations will be similar to Equation 1. However, for two-dimensional cylindrical flow, with the heat energy Q injected along a line perpendicular to the direction of flow, the exponent in the denominator will be unity and R will be $r$, corresponding to distance from the line source. For one-dimensional linear flow, with the heat energy Q injected in a plane across the linear element, the exponent in the denominator would be ½ and R would be $x$, representing the linear distance.

In general, such sets of curves, when plotted as temperature versus time, will differ from those of FIG. 7b in peak value, shape, and time occurrence. For direct comparison, it is convenient to impose additional conditions so that units of time, distance and temperature will be on a comparable basis, that is, so that the curves are normalized. FIGS. 8a and 8b illustrate the type of curves which would be obtained for one normalization procedure.

Referring to FIG. 8a, curve 18 is a temperature-distance curve at time $t_1$ which is assumed to apply for all three types of flow. On this basis, with three-dimensional spherical flow, the full line curves labeled $2.5t_1$ and $4t_1$ will be obtained. These are similar to those plotted in FIG. 7a. The curves for two-dimensional cylindrical flow are shown by dash lines for corresponding times, and the curves for one-dimensional linear flow are shown by dot-dash lines for the same time intervals.

As will be observed, at corresponding times and distances the temperatures for two-dimensional flow will be higher than those for three-dimensional flow, and those for one-dimensional flow will be still higher. This results from the decrease in volume through which heat flow takes place in going from three- to two- to one-dimensional flow.

FIG. 8b shows a replot of the data of FIG. 8a as temperature versus time for three different distances. The full line curves are for three-dimensional flow, and labeled R, 1.5R and 2R for corresponding distances. The dash curves are for two-dimensional flow and are labeled in corresponding values of $r$. The dot-dash curves are for one-dimensional flow and labeled in corresponding values of $x$. In the normalization procedure used, the point 19 is the same for unit distance and unit time of all three types of flow.

As will be observed, the peak amplitudes vary depending upon the type of flow. For example, the peak of 1.5R (off-scale) is greater than that of $1.5r$, and the latter is greater than the peak of $1.5x$. The time occurrence of the peak values also changes with the type of flow, as does the shape of the curves and the slope or rise time of the leading edges thereof.

Although in the curves shown in FIG. 8b there is a regular progression in peak values and time occurrence for the several types of flow, this is not necessarily true under other conditions of normalization and for greater distances. Nevertheless, it is clearly apparent that, for a given object, any flaw which alters the type of propagation will result in a change in slope, peak value or time occurrence.

While certain types of flaw may markedly affect the type of propagation, other types of flaws may merely introduce irregularities in heat flow without materially changing the overall type of propagation. It has been found that in such cases variations in peak amplitude, slope and time occurrence will commonly be obtained and serve to indicate the flaws.

Accordingly, it can be seen that, if a pickup is placed at a given distance from the point of injection, the response will vary in magnitude, shape and time occurrence, depending upon the type of flow present and irregularities therein. Also, with a small spacing the response for each type of flow is a sharper peak and of greater amplitude. Thus, changes in time occurrence, shape and amplitude of the received transient signals may be used as indications of flaws.

Rather than injecting a given quantity of heat energy, it may be more convenient to apply a given temperature or a given rate of energy input to the object for a short time, etc. In such case the variations in temperature with time at a pickup point will differ in detail, but with short pulses will yield transient responses which are altered by the presence of flaws. Thus different types of thermal pulse sources may be employed.

Certain examples of the usefulness of the invention may be mentioned. If the composition of the object under test differs from the intended composition in such a manner as to change its thermal conductivity, variations in peak amplitude and time of occurrence of the response with respect to the time of applying the thermal pulse will serve as an indication. Sintered metal parts may be expected to show such variations if defective. If an inhomogeneity due to a crack, void, erosion pit, etc. is present, changes in time occurrence, peak amplitude and shape may be expected, since the flaw will in general force heat to flow around it and hence increase the path length to the pickup and alter its thermal impedance.

Composite objects such as plated objects, surface-hardened objects, laminated objects, etc., will in general give a different response from a normal homogeneous object.

FIG. 2 illustrates this. Here the object 11 is shown provided with a plating 21. If the coating is of uniform thickness and properly adhered to the underlying body, a given response will be produced. However, if the coating and body have different conductivities, a variation in the coating thickness will alter this response and provide an indication. In the case of poor adherence of the coating to the underlying body, heat flow between coating and underlying body will be impaired and flow in the coating will tend toward two-dimensional flow, thereby altering the response curve. If layer 21 is a case-hardened layer of different thermal diffusivity, variations in the depth of the hardened zone or in the hardness thereof may be determined.

In the case of laminated structures, defective bonding of the layers may be detected.

It is also possible in suitable cases to detect defective surface finishes. For example, if the heat pulse source has a highly finished surface matching the configuration of the object to which it is applied, the intimacy of contact with the object will vary for different degrees of surface roughness and hence the impedance to heat flow will be different. The resultant change in heat flow to the object will affect the pickup response.

Similarly, if the pickup has a contacting surface, surface roughness will affect the pickup response.

The effect of surface finish in testing for other types of flaws can be reduced by employing pointed or sharply rounded injection and pickup probes.

Thus, in general, once the response to an acceptable part or object is determined with a particular equipment, departures therefrom for subsequent parts may be ascertained.

Referring to FIG. 3, an embodiment is shown for testing elongated objects such as rods. As shown, a rod 22 is supported at points 23 and 24 by suitable thermally-insulating means (not shown). A heat pulse is applied by a coil 25 energized with a pulse of alternating current so as to heat the end of the rod by induction. To this end, power from a suitable source such as an A.-C. power line is supplied through a time delay switch 26 and a transformer 27 to coil 25. The time delay switch energizes coil 25 for a suitably short time such as a few seconds. A clock timer may be employed for switch 26. The resultant heat pulses will be approximately constant rate of energy input pulses.

At the other end of the rod a temperature-sensitive detector is employed, and is here shown as a thermistor 28 (temperature-sensitive resistance) in contact with the rod. Thermistor 28 is included in a resistance bridge including a fixed resistor 29, a variable resistor 31 for initial bridge balance, and a reference thermistor 32 which serves to compensate for ambient temperature fluctuations. A battery 33 provides energization across one diagonal of the bridge. The other diagonal is connected to a recorder 34 through lines 35. The time of supplying the heat pulse to the rod is indicated on the recorder by supplying a pulse thereto through capacitor 36 and line 37 at the time the switch is closed.

FIG. 4 shows the results of one test with this apparatus. Here pulse 38 indicates the time of application of the heat pulse to the rod, and curve 39 is the response obtained for an unflawed rod. When a saw cut was made in the rod to introduce a flaw, the curve 41 was obtained. It will be noted that the slope of the leading edge 41' of the flaw response is less than that of the leading edge 39' of the normal response, and the rise time is correspondingly greater. Also, the peak amplitude of curve 41 is less than that of 39, and occurs at a later time. Thus, the presence of a flaw is readily apparent.

It will be noted that in FIG. 4 there is a time delay between the application of the heat pulse and the beginning of the response curves, whereas in theory some response should be obtained almost instantaneously (see FIG. 7b, for example). In practice, noise level limits the sensitivity of temperature measuring devices, even with high amplification. Thus some time delay may be expected before a temperature rise is apparent. Also, due to this factor, the initial rise of curve 41 may be slightly delayed with respect to that of curve 39.

Referring now to FIGS. 5a and 5b, an embodiment is shown employing one heat source and a plurality of temperature detectors. Here the heat source 45 is arranged to be mechanically advanced to and retracted from the object 11 by a suitable mechanism 46. The latter may be cam-operated, solenoid-operated, etc. The heat source may be an electrically heated device of the soldering iron type, with a suitably shaped tip 47 for contact with the body 11. With a large thermal capacity approximately a constant temperature pulse will be applied. With a small thermal capacity and small rate of heating (or discontinuance of heating during application), heat pulses tending toward constant energy pulses may be obtained.

A plurality of pickups 48, 49, 50 and 51 are spaced around the heat source 45 at uniform distances. As specifically shown, four are employed. In the absence of a flaw, the response of the pickups should be substantially the same. However, if a flaw such as indicated at 52 is present, the response of pickup 50 will occur somewhat later than the others and in general will be of different amplitude and shape. The responses are subtracted from each other in unit 53 and then displayed. For example, if the responses are designated $R_1$, $R_2$, $R_3$ and $R_4$ from respective pickups 48, 49, 50, and 51, each may be subtracted from each of the others.

The results of the measurement are illustrated in FIGS. 6a and 6b. Here curve 54 indicates the responses $R_1$, $R_2$ and $R_4$ which will be substantially the same as the response in the absence of a flaw. The response $R_3$ is shown by curve 55, corresponding to that from pickup 50 in the presence of a flaw. When response $R_3$ is subtracted from the response of any one of the others, a resultant curve such as shown at 56 is obtained. The difference between the other responses will be approximately zero. Hence curve 56 serves to indicate the presence of a flaw and its general location.

Instead of employing uniform spacings of the pickups from the heat injection point, non-uniform spacings could be employed and two or more pickups could be positioned in the same general direction from the injection point. By comparing the outputs of two or more pickups, the relative output or outputs can be determined. Such a relative output will have a characteristic amplitude, shape and time occurrence for an unflawed or standard part, and will change in one or more of these respects in the presence of flaws. That is, once the relative response of an acceptable part is known, a substantial departure in the relative response of a part under test will indicate the presence of a defect or flaw.

The choice of injected pulse duration and separation of injector and pickup will depend on the particular application. Generally, it is preferred to relate the two factors so as to give a definitely peaked response at the pickup point. For the detection of small flaws, a small separation is desirable, since the total volume available for heat flow with a large separation may mask the small discontinuity introduced by the flaw. Also a short pulse is desirable. This is particularly true for surface flaws. On the other hand, a larger separation may facilitate detecting deep-seated extensive flaws.

The use of a temperature-time display permits time occurrence, peak amplitude and wave shape of the pickup response all to be taken into account in determining the presence or absence of flaws. However, in some applications only one of these factors may suffice. In such case suitable indicating apparatus may be employed, as will be understood by those skilled in the art. For example, changes in peak value may be determined by using known types of indicators for determining whether the amplitude of the peak falls within predetermined limits or not.

In the specific embodiments, contacting types of heat detectors are shown. However, it will be understood that non-contacting types can also be used, if desired. These may be infrared detectors of the bolometer type, or other types responsive to radiant energy from localized regions of the object, etc.

I claim:

1. Apparatus for the non-destructive testing of objects to detect defects or flaws therein which comprises means for applying a thermal pulse to a localized region on one surface of a said object, pickup transducer means responsive to the temperature of said object at a localized region on said one surface spaced from the region of thermal pulse application for producing a pulse signal output having leading and trailing edges of substantial slope and a peak value therebetween, and display means for displaying the rise and fall of said pulse signal output as a function of time, whereby the pulse signal output from the object under test may be compared with that of an acceptable object to detect defects or flaws therein.

2. Apparatus for the non-destructive testing of objects to detect defects or flaws therein which comprises means for applying a thermal pulse to a localized region of a said object, pickup transducer means responsive to the temperature of said object at a localized region spaced from the region of thermal pulse application by a distance greater than the extent of the region of thermal pulse application for producing a pulse signal output having leading and trailing edges of substantial slope and a peak value therebetween, and display means for displaying the rise and fall of said pulse signal output as a function of time, whereby the pulse signal output from the object under test may be compared with that of an acceptable object to detect defects or flaws therein.

3. Apparatus for the non-destructive testing of objects to detect defects or flaws therein which comprises means for applying a thermal pulse to a localized region of a said object, pickup transducer means responsive to the temperature of said object at a localized region spaced from the region of thermal pulse application for producing a pulse signal output having leading and trailing edges of substantial slope and a peak value therebetween, and means for determining changes in said peak value, whereby a substantial change in peak value from that of an acceptable object may be used as an indication of defects or flaws in the object under test.

4. Apparatus for the non-destructive testing of objects to detect defects or flaws therein which comprises means for applying a thermal pulse to a localized region of a said object, a plurality of pickup transducers responsive to the temperature of the object at respective localized regions spaced from the region of heat pulse application to yield respective pulse signal outputs which rise to a peak value and fall thereafter, and means for determining changes in one pulse signal output relative to another pulse signal output, whereby changes in the relative output may be used as an indication of defects or flaws in the object under test.

5. Apparatus in accordance with claim 4 including means for determining changes in relative peak amplitude of a plurality of pulse signal outputs.

6. Apparatus in accordance with claim 4 including means for determining changes in relative time occurrence of a plurality of pulse signal outputs.

7. Apparatus in accordance with claim 4 including means for determining changes in the slope of the leading edges of a plurality of pulse signal outputs.

8. A method for the non-destructive testing of objects to detect defects or flaws therein which comprises applying a thermal pulse to a localized region of said object, detecting the rise and fall of the temperature of a localized region of said object spaced from the region of thermal pulse application to yield a pulse temperature response having a peak value with leading and trailing edges of substantial slope, and comparing said pulse temperature response with the corresponding pulse temperature response of an acceptable object in respect to at least one of the factors: peak amplitude, rise time, shape and pulse time occurrence to determine the presence of defects or flaws in the object under test.

9. A method in accordance with claim 8 including at least temporarily recording the variation in temperature at the detection region as a function of time.

10. A method in accordance with claim 8 in which the peak amplitudes of the respective pulse temperature responses are compared.

11. A method in accordance with claim 8 in which the time occurrence of corresponding portions of the respective pulse temperature responses are compared.

12. A method for the non-destructive testing of objects to detect defects or flaws therein which comprises applying a thermal pulse to a localized region of a said object, detecting the rise and fall of the temperature of a plurality of localized regions of said object spaced from the region of thermal pulse application to yield respective pulse temperature responses each having a peak value with leading and trailing edges of substantial slope, and comparing at least one of said pulse temperature responses with another of said pulse temperature responses to determine departures therefrom from corresponding responses of an acceptable object and thereby determine the presence of defects or flaws in the object under test.

References Cited by the Examiner

UNITED STATES PATENTS 2,323,715  7/1943  Kuehni _____ 73—15

FOREIGN PATENTS 270,583  2/1914  Germany.

OTHER REFERENCES

Parker et al.: "A Flash Method of Determining Thermal Diffusivity, Heat Capacity and Thermal Conductivity," R & D technical report USNRDL. TR–424 May 20, 1960.

Parker et al.: "Flash Method of Determining Thermal Diffusivity, Heat Capacity and Thermal Conductivity," Journal of Applied Physics, vol. 32, September 1961, pages 1679–1684.

LOUIS R. PRINCE, *Primary Examiner.*

RICHARD QUEISSER, *Examiner.*